US006913493B2

United States Patent
Berg et al.

(10) Patent No.: US 6,913,493 B2
(45) Date of Patent: Jul. 5, 2005

(54) SEALED ELECTRICAL CONNECTOR ASSEMBLY AND METHOD OF FABRICATING SAME

(75) Inventors: Paul Christopher Berg, Batavia, IL (US); Frank T. Keyser, Elk Grove Village, IL (US); Jonathan D. Lohman, West Chicago, IL (US)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 10/701,996

(22) Filed: Nov. 5, 2003

(65) Prior Publication Data

US 2005/0095922 A1 May 5, 2005

(51) Int. Cl.[7] .............................................. H01R 13/405
(52) U.S. Cl. ....................................................... 439/736
(58) Field of Search ................................. 439/736, 604

(56) References Cited

U.S. PATENT DOCUMENTS

| 4,804,805 A | * | 2/1989 | Antonas et al. ............ 174/52.2 |
| 5,122,858 A | * | 6/1992 | Mahulikar et al. .......... 257/753 |
| 6,214,152 B1 | * | 4/2001 | Ross et al. ................... 156/245 |

* cited by examiner

*Primary Examiner*—Neil Abrams
*Assistant Examiner*—Phuong Dinh
(74) *Attorney, Agent, or Firm*—Stacey E. Caldwell

(57) ABSTRACT

An electrical connector assembly includes a support structure, with a molded plastic connector housing overmolded about an interface area between the support structure and the connector housing. A compliant layer is deposited between the support structure and the overmolded connector housing over the interface area to fill and seal the interface area when the molded plastic housing cures.

25 Claims, 2 Drawing Sheets

US 6,913,493 B2

SEALED ELECTRICAL CONNECTOR ASSEMBLY AND METHOD OF FABRICATING SAME

FIELD OF THE INVENTION

This invention generally relates to the art of electrical connector assemblies and, particularly, to a sealed connector assembly which includes an overmolded connector housing.

BACKGROUND OF THE INVENTION

Generally, a typical electrical connector includes a dielectric housing which mounts a plurality of conductive terminals for engaging the terminals of a complementary mating connecting device. The dielectric housing often is not a stand-alone component, but the housing is mounted on some form of support structure which can range from a supporting frame component to a complementary mating connector housing or other type of casing. The area where the connector housing is supported may be called a supporting interface or, in the case of a complementary mating connector, a mating interface.

In some applications, it is desirable, if not necessary, to seal the supporting or mating interface of an electrical connector assembly to protect the interior components, such as the terminals, from harsh environments that can range from mere dust or dirt to very corrosive materials such as salt. An example of such a harsh environment is in automotive applications.

In some other applications, electrical connector housings are molded of plastic material and are overmolded about portions of a support structure. Again, the support structure can range from a frame component to a housing of another mating connecting device. By overmolding the connector housing on or to the support structure, extraneous latching devices are eliminated. In addition, the overmolded plastic material of the housing can provide some degree of sealing between the housing and the interface area of the support structure. Unfortunately, in very harsh environments, this sealing effect is not adequate because, as the plastic material cools during the molding and curing process, the plastic material shrinks and can create a small gap between the overmolded plastic material and the support structure at the supporting interface. Corrosive material then can migrate through this gap to the internal terminals of the connector assembly. The present invention is directed to solving these problems by providing an improved sealing system between a molded plastic connector housing and the support structure to which the housing is overmolded.

SUMMARY OF THE INVENTION

An object, therefore, of the invention is to provide a new and improved sealed electrical connector assembly which includes an overmolded plastic connector housing, along with a method of fabricating the connector assembly.

In the exemplary embodiment of the invention, the sealed electrical connector assembly includes a support structure and a molded plastic connector housing overmolded about a portion of the support structure at an interface area between the support structure and the connector housing. A compliant layer is deposited between the support structure and the overmolded connector housing over at least a portion of the interface area to fill and seal the interface area when the molded housing cures.

In one embodiment of the invention, the compliant layer comprises a conformal film coated on the support structure in the interface area before the housing is overmolded on the support structure. The conformal film may be provided of a silicone adhesive material, a thermoplastic elastomer material or the like. In another embodiment, the compliant layer may be provided as a preformed component.

The support structure is shown herein as a casing having an interior cavity, with a connector-receiving passage communicating with the cavity. An upstanding flange is disposed about the passage. The molded plastic connector housing is overmolded about the peripheral flange and in the passage. The compliant layer is deposited about the peripheral flange of the support structure and about which the connector housing is overmolded to fill and seal any gap therebetween when the molded housing cures. The compliant layer may comprise a conformal film coated on the peripheral flange before the connector housing is overmolded thereabout.

In the detailed embodiment, the casing is a two-part structure including a base part and a cover part forming the interior cavity therebetween. The connector-receiving passage is provided through the cover part, with the upstanding flange extending thereabout.

The invention contemplates a method of fabricating the electrical connector assembly described above.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
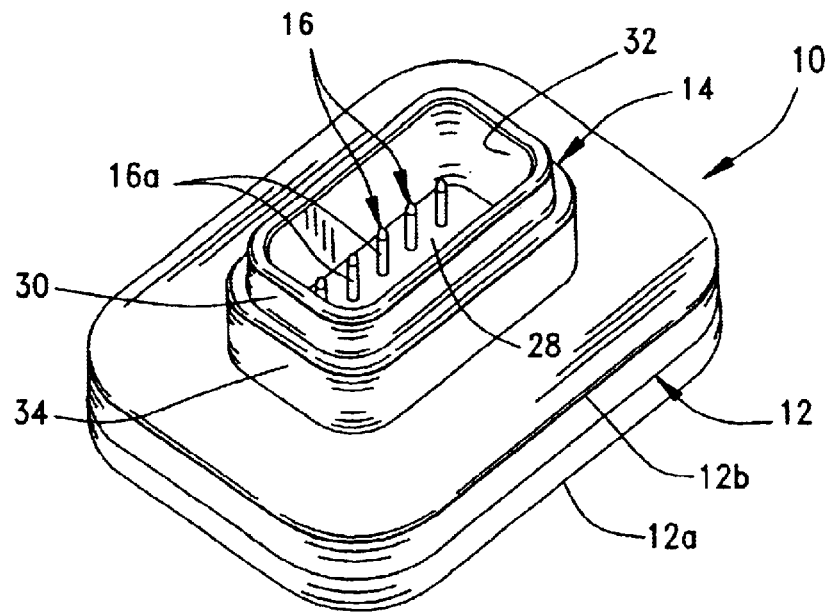
FIG. 1 is a perspective view of a sealed electrical connector assembly embodying the concepts of the invention.
Figure 3:
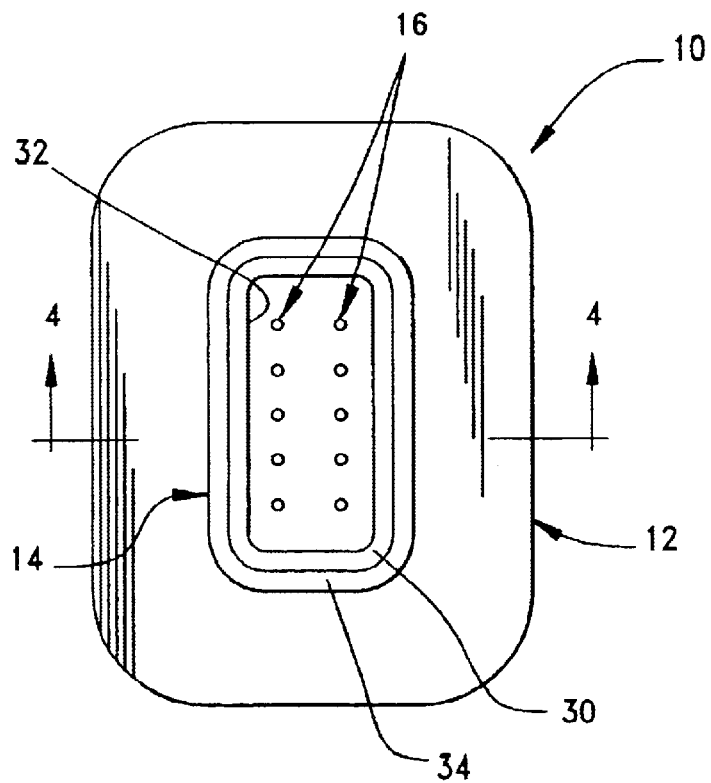
FIG. 3 is a top plan view of the connector assembly.

Referring to the drawings in greater detail, the invention is embodied in an electrical connector assembly, generally designated 10, which includes a support structure, generally designated 12. A molded plastic connector housing, generally designated 14, is overmolded about a portion of the support structure, as described hereinafter. A plurality of terminal pins, generally designated 16, extend through the connector housing.

Figure 4:
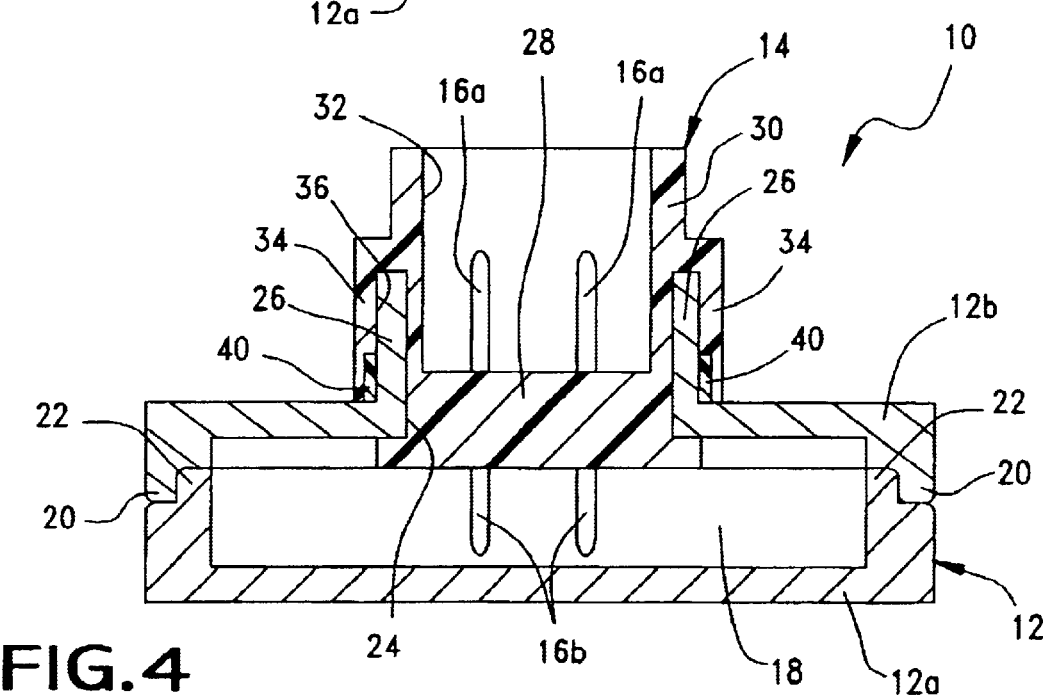
FIG. 4 is a vertical section, on an enlarged scale, taken generally along line 4—4 of FIG. 3.

More particularly, support structure 12 is in the form of a generally hollow casing which may be fabricated of die-cast metal material and which defines an interior cavity 18 (FIG. 4). The casing is a two-part structure including a base part 12a and cover part 12b. The cover part has a peripheral depending flange 20 which surrounds and engages an upstanding peripheral flange 22 of the base part when the two parts are assembled as shown in FIG. 4. The two parts can be secured together by appropriate adhesives located at the interface between flanges 20 and 22 to seal interior cavity 18. Finally, cover part 12b includes a connector-receiving passage 24 (FIG. 2) which is surrounded by an upstanding peripheral flange 26. Passage 24 communicates with interior cavity 18 of the casing.

Connector housing 14 is overmolded to cover part 12b of casing 12 before base part 12a is secured to the cover part. As best seen in FIG. 4, the overmolded plastic connector housing includes a main body portion 28 molded within passage 24 of cover part 12b. A shroud 30 projects outwardly of the main body portion and defines a receptacle 32 for receiving a complementary mating connector. An L-shaped flange 34 is molded around the outside of shroud 30 to define a groove 36 which receives peripheral flange 26 of cover part 12b of casing 12. Therefore, the L-shaped flange surrounds the outside of peripheral flange 26, while shroud 30 and body portion 28 cover the entire inside of peripheral flange 26, to form a tongue-and-groove interconnection between the overmolded housing and the casing. This specific configuration of connector housing 14 as seen best in FIG. 4 is fabricated by overmolding the connector housing to cover part 12b of the casing by appropriately configured molding dies.

Terminal pins 16 extend through main body portion 28 of connector housing 14, with contact ends 16a of the terminal pins projecting into receptacle 32 for engaging appropriate contacts of the complementary mating connector which is inserted into the receptacle. Opposite termination ends 16b of the terminal pins project into interior cavity 18 and may be terminated to appropriate circuit traces on a circuit board mounted within the interior cavity of the casing. The terminal pins may be press-fit through appropriate terminal-receiving passages molded in main body portion 28 of the connector housing. Alternatively, the housing may be overmolded about the pins during the overmolding process of the housing, while the pins are held by an appropriate fixture.

As is known, the plastic material of overmolded plastic housing 14 is overmolded in a somewhat liquified state at an elevated temperature and then cools as the plastic material cures into a solid structure. As the plastic material cools, it shrinks to a certain degree. The shrunk plastic material can create gaps, such as between overmolded plastic housing 14 and peripheral flange 26 of casing 12. This could allow contaminants to migrate from the environment, through the gap and into the interior of the connector assembly, such as into interior cavity 18. In order to fill and seal any such gaps, the invention, generally, contemplates depositing a compliant layer between the casing and the overmolded housing in at least a portion of an interface area therebetween. In the preferred embodiment, a compliant layer 40 is positioned about the outside of peripheral flange 26 whereby the compliant layer will be located between peripheral flange 26 and L-shaped flange 36 of the overmolded connector housing. During the overmolding process, the molten plastic material is injected into the molding dies under pressure which will compress compliant layer 40. As the plastic material cools and shrinks, the compliant layer then can expand to fill and seal any gap created between the plastic material and the rigid peripheral flange 26 of casing 12.

Figure 2:
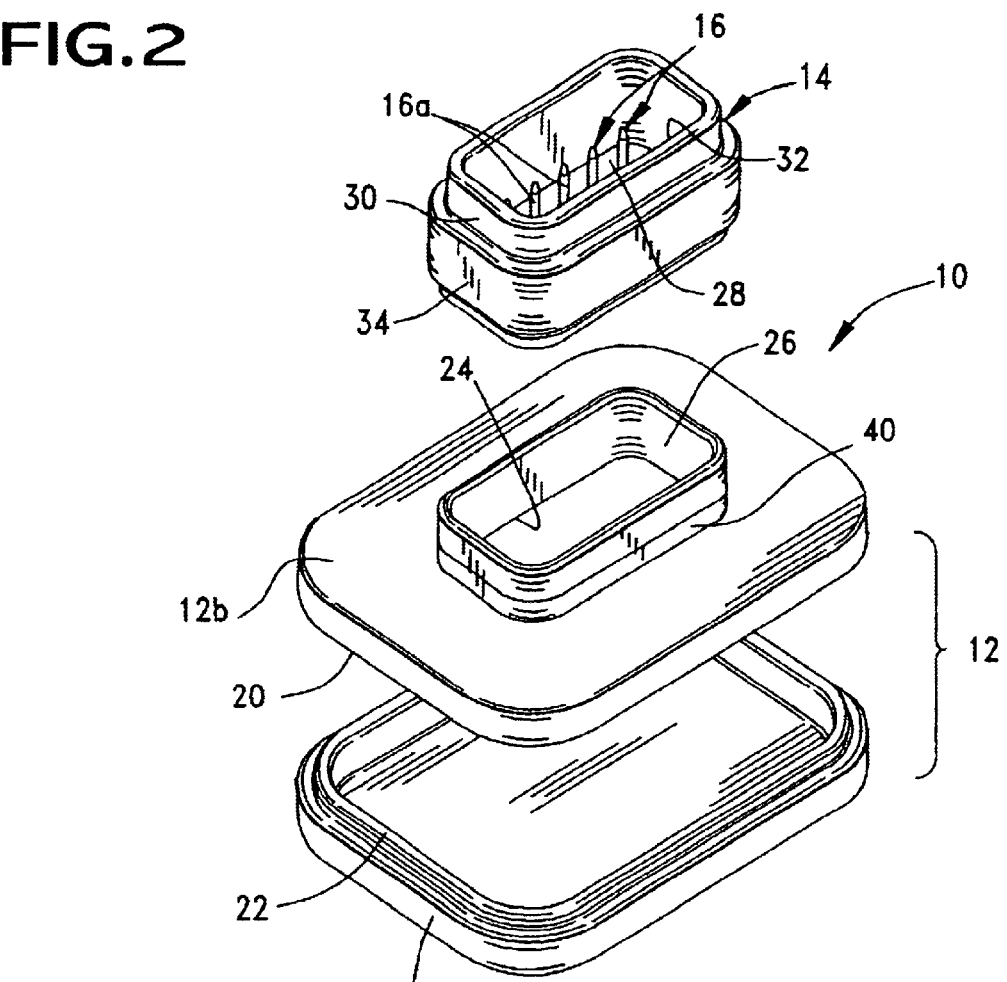
FIG. 2 is an exploded perspective view of the connector assembly.

The invention contemplates that compliant layer 40 may be provided by a conformal film coated on support structure 12 as shown in FIG. 2, before connector housing 14 is overmolded thereabout. The conformal film may be provided of a silicone adhesive material, a thermoplastic elastomer material or the like. Alternatively, rather than coating the material on the support structure, the material may be provided as a preformed component.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A sealed electrical connector assembly comprising:
   a support structure having an interior cavity in which electrical components can be disposed;
   a molded plastic connector housing overmolded about at least a portion of the support structure at an interface area which defines a potential gap between the support structure and the connector housing which would form a potential migratory path for contaminants from the environment into the interior cavity and the electrical components therein; and
   a compliant layer deposited between the support structure and the overmolded connector housing over at least a portion of said interface area to fill and seal said gap when the molded plastic housing cures to protect the interior electrical components from the environment.

2. The electrical connector assembly of claim 1 wherein said compliant layer comprises a conformal film coated on the support structure in said at least a portion of said interface area before the housing is overmolded on the support structure.

3. The electrical connector assembly of claim 2 wherein said conformal film comprises a silicone adhesive.

4. The electrical connector assembly of claim 2 wherein said conformal film comprises a thermoplastic elastomer.

5. The electrical connector assembly of claim 1 wherein said compliant layer comprises a preformed component.

6. A sealed electrical connector assembly, comprising:
   a support structure in the form of a casing having an interior cavity, a connector-receiving passage communicating with the cavity and an upstanding flange about the passage;
   a molded plastic connector housing overmolded about the peripheral flange and in the passage; and
   a compliant layer deposited about the peripheral flange before the connector housing is overmolded thereabout.

7. The electrical connector assembly of claim 6 wherein said compliant layer comprises a conformal film coated on the peripheral flange before the connector housing is overmolded thereabout.

8. The electrical connector assembly of claim 7 wherein said conformal film comprises a silicone adhesive.

9. The electrical connector assembly of claim 7 wherein said conformal film comprises a thermoplastic elastomer.

10. The electrical connector assembly of claim 6 wherein said compliant layer comprises a preformed component.

11. A sealed electrical connector assembly, comprising:
    a first, rigid connector component having an interior cavity in which electrical components can be disposed;
    a second, molded plastic connector component overmolded about at least a portion of the first connector component at an interface area therebetween which defines a potential gap between the first and second connector components which would form a potential migratory path for contaminants from the environment into the interior cavity and the electrical components therein; and
    a compliant layer deposited between the connector components over at least a portion of said interface area to fill and seal said gap when the molded plastic component cures to protect the interior electrical components from contaminants migrating into the interior cavity.

12. The electrical connector assembly of claim 11 wherein said compliant layer comprises a conformal film coated on the first connector component in said at least a portion of said interface area before the second component is overmolded on the first connector component.

13. The electrical connector assembly of claim 12 wherein said conformal film comprises a silicone adhesive.

14. The electrical connector assembly of claim 12 wherein said conformal film comprises a thermoplastic adhesive.

15. The electrical connector assembly of claim 11 wherein said compliant layer comprises a preformed component.

16. A sealed electrical connector assembly, comprising:
   a support structure;
   a molded plastic connector housing overmolded about at least a portion of the support structure at an interface area comprising a tongue-and-groove structure between the support structure and the connector housing; and
   a compliant layer deposited between the support structure and the overmolded connector housing over at least a portion of said interface area to fill and seal the portion of the interface area when the molded plastic housing cures.

17. The electrical connector assembly of claim 16 wherein said interface area comprises a tongue on the support structure with the connector housing overmolded thereabout.

18. The electrical connector assembly of claim 17 wherein said compliant layer is deposited on said tongue prior to said connector housing being overmolded thereabout.

19. The electrical connector assembly of claim 8 wherein said tongue comprises a peripheral flange about a passage in the support structure in which the connector housing is molded.

20. A sealed electrical connector assembly, comprising:
   a support structure comprising a two-part structure including a base part and a cover part forming an interior cavity therebetween, the cover part including a connector-receiving passage having an upstanding peripheral flange thereabout;
   a molded plastic connector housing overmolded about at least a portion of the support structure at an interface area including the peripheral flange and in the passage; and
   a compliant layer deposited between the support structure and the overmolded connector housing over at least a portion of said interface area to fill and seal the portion of the interface area when the molded plastic housing cures.

21. The electrical connector assembly of claim 20 wherein said compliant layer is deposited about said peripheral flange.

22. A method of fabricating a sealed electrical connector assembly, comprising the steps of:
   providing a support structure having an interior cavity in which electrical components can be disposed;
   overmolding a molded plastic connector housing about at least a portion of the support structure at an interface area which defines a potential gap between the support structure and the connector housing which would form a potential migratory path for contaminants from the environment into the interior cavity and the electrical components therein; and
   depositing a compliant layer on the support structure before the connector housing is overmolded about the interface area, the compliant layer filling and sealing said gap when the molded plastic housing cures to protect the interior electrical components from the environment.

23. The method of claim 22 including the step of providing said compliant layer as a conformal film coated on the interface area of the support structure before the housing is overmolded on the support structure.

24. The method of claim 23 including providing said conformal film of silicone adhesive material.

25. The method of claim 23 including providing said conformal film of thermoplastic elastomer material.

* * * * *